United States Patent [19]

Kuze

[11] Patent Number: 4,679,530
[45] Date of Patent: Jul. 14, 1987

[54] COOLING SYSTEM FOR AN AUTOMOBILE ENGINE

[76] Inventor: Yoshikazu Kuze, 31-3, Higashimagome 1-chome, Ohta-ku, Tokyo, Japan

[21] Appl. No.: 830,093

[22] Filed: Feb. 18, 1986

[30] Foreign Application Priority Data

Feb. 19, 1985 [JP] Japan .............................. 60-029388
Apr. 26, 1985 [JP] Japan .............................. 60-088771
Apr. 26, 1985 [JP] Japan .............................. 60-088772

[51] Int. Cl.⁴ .............................................. F01P 7/16
[52] U.S. Cl. .................................. 123/41.1; 236/34.5
[58] Field of Search ................ 123/41.08, 41.09, 41.1; 236/34.5

[56] References Cited

U.S. PATENT DOCUMENTS

| | | | |
|---|---|---|---|
| 3,554,440 | 1/1971 | Austin et al. | 236/34.5 |
| 3,921,600 | 11/1975 | Henning et al. | 236/34.5 |
| 4,288,033 | 9/1981 | Wisyanski | 236/34.5 |

Primary Examiner—William A. Cuchlinski, Jr.
Attorney, Agent, or Firm—Birch, Stewart, Kolasch & Birch

[57] ABSTRACT

A cooling system has a first passage communicating an outlet of water jackets with an inlet of a radiator, a second passage communicating an outlet of the radiator with an inlet of a water pump, and a bypass connected between the first passage and a thermostat housing. A thermostat comprising a thermo-sensitive device and a valve is disposed in the second passage, so that the valve closes the second passage. The thermo-sensitive device is disposed in the bypass, so that the thermo-sensitive device is exposed to coolant passing the bypass.

3 Claims, 11 Drawing Figures

COOLING SYSTEM FOR AN AUTOMOBILE ENGINE

BACKGROUND OF THE INVENTION

The present invention relates to an engine cooling system for an automobile.

Figure 1:
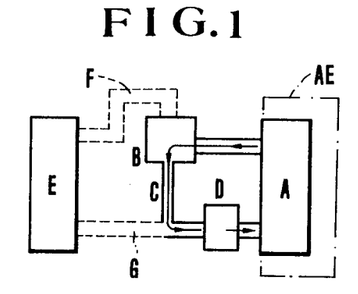
FIGS. 1 and 2 are schematic block diagrams showing circulations of a conventional cooling system for an automobile engine.

As shown in FIG. 1, a conventional cooling system in an automobile engine has a thermostat housing B disposed in a coolant passage F between an upper outlet of water jackets A of an engine AE and an upper inlet of a radiator E. A lower outlet of the radiator E is connected to a lower inlet of water jackets A by a passage G through a water pump D. A small bypass passage C is disposed between the thermostat housing B and water pump D.

During engine warmup at the initial stage, since the engine is cold, a thermostat valve in the thermostat housing B is closed to cut off the flow of coolant through the radiator E. Coolant is circulated by water pump D through water jackets A, thermostat housing B, and small bypass C as indicated by arrows, so that the temperature of the coolant rapidly rises.

Figure 2:
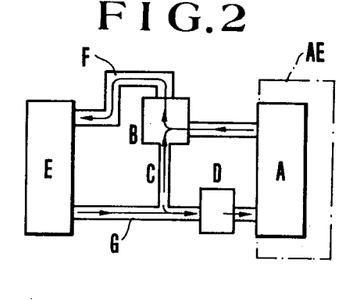

As shown in FIG. 2, when the engine reaches its normal operating temperature, and the temperature of the coolant reaches a predetermined opening temperature of the thermostat, the thermostat starts to open. Thus, a part of coolant flows from the thermostat housing B into the radiator E through the passage F and flows from top to bottom in the radiator E, and drawn into the water jackets A through the passage G by the water pump D together with the coolant from bypass passage C, as indicated by arrows.

In practice, however, the heat sensitivity of the thermostat is low, so that the temperature rising rate of the thermostat is slow compared with the temperature rising rate of the coolant. Under certain conditions, the thermostat does not open at the predetermined temperature. For example, the thermostat starts to open at a temperature which is higher by about 20° C. than the predetermined temperature. In such a case, since the thermostat suddenly opens and the low temperature coolant flows from the radiator E into the water jackets A through the water pump D, the temperature of coolant is rapidly lowered by the radiator which causes the thermostat to close again. If the peak of the heat overshoot occurring in the initial opening period of thermostat and the surge of pressure occurring at the closing of the thermostat simultaneously occur and repeat, so that cracks of water jackets, cylinder head, breakdowns of the thermostat, radiator, and other problems will occur, this will cause serious engine troubles.

SUMMARY OF THE INVENTION

An object of the present invention is to provide a cooling system for an automobile engine which may eliminate the heat overshoot and the surge pressure which occurs when a thermostat opens and may avoid the influence of the ambient temperature.

Another object of the present invention is to provide a cooling system which may improve reliability and safety and have a high thermal efficiency for the engine and reduce engine emission.

A further object of the present invention is to provide a cooling system in which the thermostat is conveniently disposed for easy maintenance and check.

According to the present invention, there is provided a cooling system for an automobile engine comprising, a first passage communicating an outlet of the water jackets with a lower inlet of a radiator, a second passage communicating an upper outlet of the radiator with an inlet of a water pump and having a thermostat housing; and a bypass connected between the first passage and the thermostat housing. A thermostat comprising a thermo-sensitive device and a first valve is disposed in the second passage, so that the first valve closes the second passage. The thermo-sensitive device is disposed in the bypass so that the thermo-sensitive device is exposed to the coolant passing the junction.

In a aspect of the invention, the thermostat has a second valve provided so as to close the bypass when the first valve opens, and the inlet of the radiator is provided at a lower position thereof.

These and other objects and features of the present invention will become more apparent from the following description with reference to the accompanying drawings.

DESCRIPTION OF THE PREFERRED EMBODIMENTS

Figure 3:
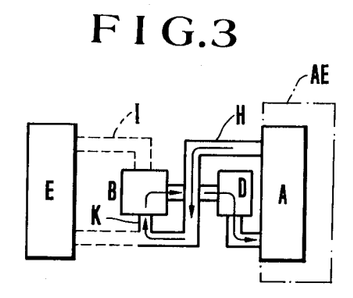
FIGS. 3 and 4 are schematic block diagrams showing circulations of an engine cooling system according to the present invention.

Referring to FIG. 3, in an embodiment of the present invention, the upper outlet of the water jackets A of the engine AE is connected to the lower inlet of the radiator E through a passage H and the upper outlet of a radiator E is connected to the lower inlet of the water jackets A by a passage I through the thermostat housing B and water pump D. The coolant is circulated as shown by arrows. In such a cooling system, the heat of the circulating coolant is conducted to the coolant in the radiator E, and the coolant in the radiator is preheated by the convection.

When the engine is warmed up and the thermostat is closed, the coolant circulates passing water jackets A and the thermostat housing B through passage H and bypass passage K, as indicated by arrows in FIG. 3.

Figure 4:
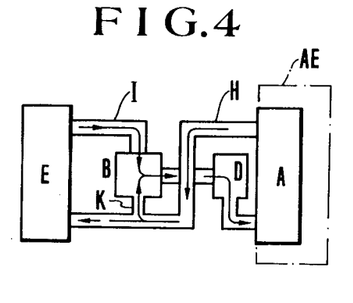

As shown in FIG. 4, when the thermostat opens, the coolant pumped out from the radiator E to the water jackets A by the water pump D flows in the radiator E from the bottom to top thereof and is drawn into the thermostat housing B through the passage I. Thus, stored heat energy effectively acts on.

Figure 5:
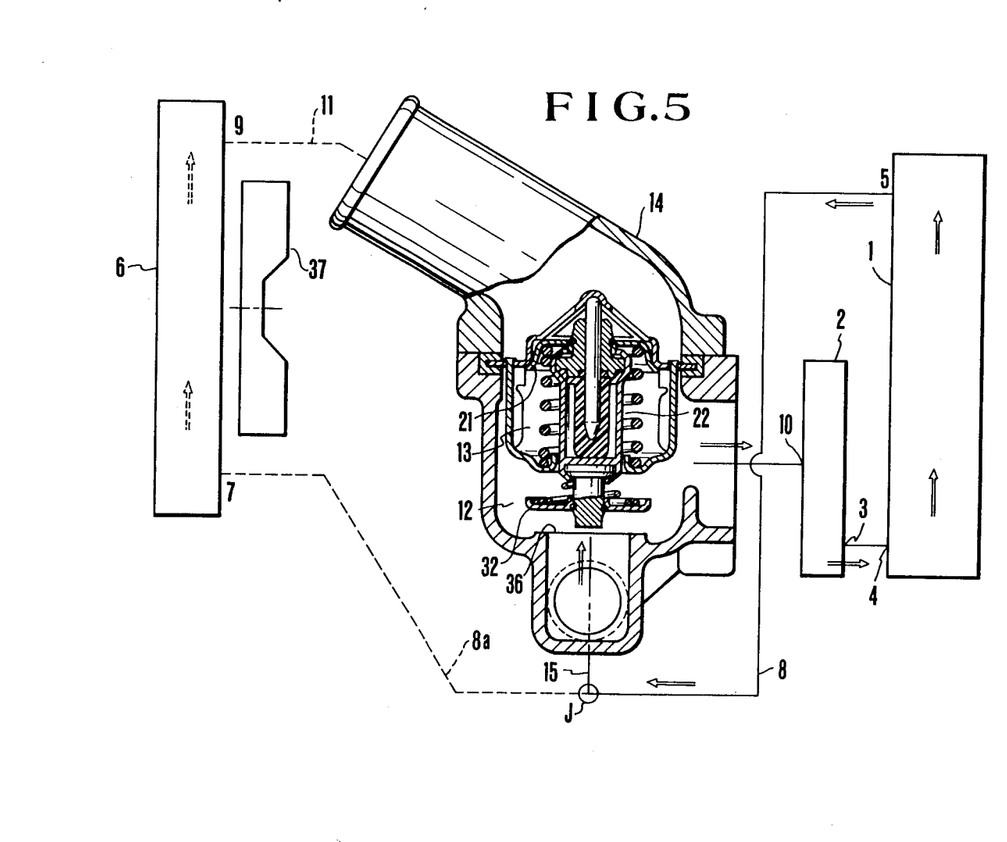
FIG. 5 is a schematic diagram of an engine cooling system according to the present invention partly shown in section, wherein a thermostat is closed.

Explaining in more detail with reference to FIG. 5, a cooling system for an automobile engine of the present invention comprises water jackets 1 for engine cylinders, a water pump 2, an outlet 3 of which is connected to a lower inlet 4 of the water jackets 1. An upper outlet 5 of the water jackets 1 is directly connected to a lower inlet 7 of a radiator 6 by passages 8 and 8a. An upper outlet 9 of the radiator 6 is connected to an inlet 10 of the water pump 2 through a passage 11. A thermostat housing 12 is disposed in the passage 11 between water pump 2 and radiator 6. In the thermostat housing 12, a thermostat 13 is mounted in a normal disposition. The thermostat 13 is secured to the housing 12 by a cap 14. A large bypass passage 15 is disposed between a bypass opening 36 of the housing 12 and a junction J of passage 8.

Figure 6:
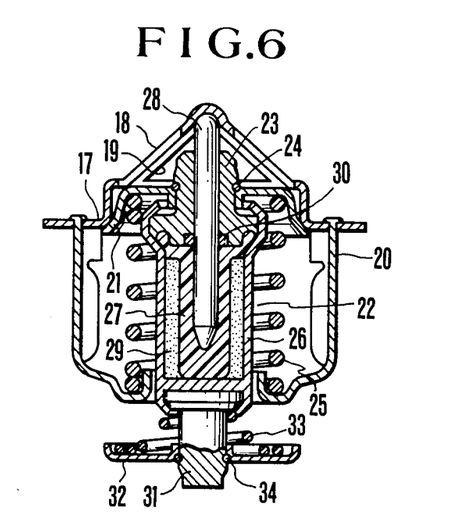
FIG. 6 is a sectional view of the thermostat in closed state.
Figure 7:
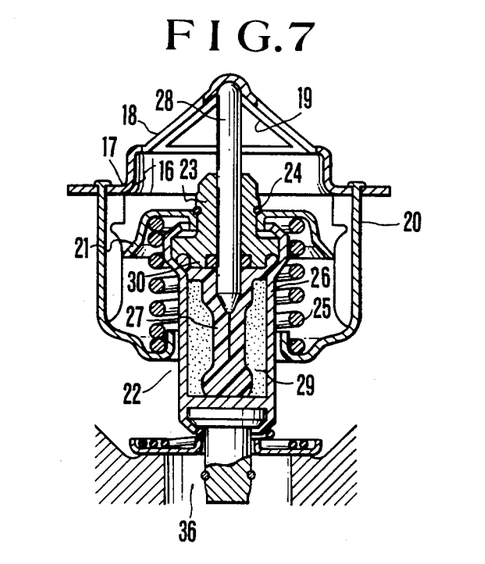
FIG. 7 is a sectional view of the thermostat in fully opened state.
Figure 8:
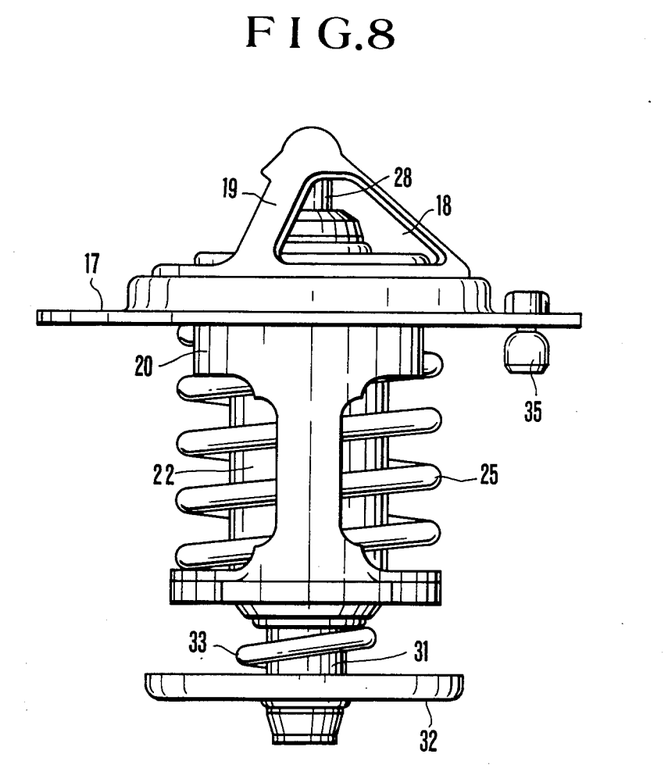
FIG. 8 is a side view of the thermostat.

Referring to FIGS. 6 to 8, the thermostat 13 comprises a flange 17 secured to the housing 12 and forming a valve seat 16 and an upper frame 19 having openings 18 for the coolant, and a lower frame 20 secured to the flange 17. A well known thermo-sensitive device 22 is disposed adjacent the junction of the passage 11 and bypass 15. The thermo-sensitive device 22 comprises a steel piston 28 secured to the upper frame 19, guide member 23 slidably engaged with the piston 28, primary valve 21 engaged with the guide member 23 and fixed by a snap ring 24, heat conductive cylinder 26 secured to guide member 23, rubber diaphragm 27, wax filled pellet 29, and packing 30. A return coil spring 25 disposed surrounding the cylinder 26 is provided between the primary valve 21 and the bottom of the lower frame 20. Secured to the bottom of cylinder 26 is a shaft 31 on which a secondary valve 32 is slidably mounted. A coil spring 33 is provided between the valve 32 and cylinder 26 to urge the valve 32 to a stopper ring 34.

It is desirable that the thermo-sensitive device 22 of the thermostat 13 be constructed so as not to be cooled by the coolant in passage 11 through the primary valve 22. If the thermo-sensitive device 22 is cooled by the low temperature coolant in the passage 11 when the valve 21 is closed, the thermostat 13 is not opened until the temperature becomes much higher than the predetermined value of the thermostat. This causes heat overshoot and surge. Accordingly, in the present invention, the primary valve 21 is separated from the thermostatic device 22 by the guide member 23. Further, the primary valve 21 and guide member 23 are made of heat nonconducting material. Further, it is preferable to make the valve 21 coating with rubber so as to prevent the coolant from leaking when the valve is closed.

Referring to FIG. 7, when the temperature of the coolant rises in excess of the predetermined value of the thermostat 13, the wax 29 expands. This forces the rubber diaphragm 27 against the steel piston 28. As the wax squeezes the rubber diphragm 27 around the piston 28, the pellet 29 overcomes the coil spring and the thermo-sensitive device 22 moves downward, thereby opening the valve 21. In normal operation, the primary valve 21 is opened by heat from the coolant and closed by spring pressure. When the thermostat 13 cools, the wax 29 contracts. Then the coil spring 25 returns the valve to the closed position as shown in FIG. 6.

In operation, as shown in FIG. 5, during engine warmup, since the primary valve 21 of the thermostat 13 closes, the coolant drawn from the water jackets 1 through the water pump 2 circulates passing bypass passage 15, opening 36, thermostat housing 12, as indicated by arrows. The coolant does not circulate through radiator 6. However, the outlet 5 of water jackets 1 is communicated with the lower inlet 7 of the radiator 6. Therefore, the heat of the circulated coolant in the passage 8 is transferred to the coolant in passage 8a and radiator 6 by conduction and convection. The conduction and convection of heat are efficiently performed from the bottom to top of the radiator 6 and the passage 11 as a matter of course. Further, the heat is successively stored in the radiator keeping warm under a hood of the engine room so that thermal gradient between the top and bottom of the radiator 6 is reduced. Accordingly, the ambient temperature does not affect on the coolant temperature in the radiator, so that it is unnecessary to exchange the thermostat in accordance with the season.

Since the thermal energy of the coolant in the short circulation is stored in the radiator 6, passage 11 and cap 14, the temperature of coolant in the housing 12 rises gradually. The temperature rising rate of the coolant in the thermostat housing 12 is moderated to approach the temperature rising rate of the thermostat 13. The difference between the temperature in thermostat housing 12 and the temperature in cap 14 becomes very small.

In such a state, the thermostat 13 begins to open. At first, since a small amount of coolant from the passage 11 flows into the thermostat housing 12 through the primary valve 21 and is mixed with a large amount of bypass flow of coolant, the temperature of the coolant in the housing 12 hardly lowers. Even if the temperature of coolant is somewhat lowered, the thermostat does not immediately respond to close the valve 21. Accordingly, after the initial opening of thermostat, the heat overshoot and surge do not occur. As the temperature of coolant rises, the opening lift of the primary valve 21 increases, and inversely, the secondary valve 32 begins to close the bypass opening 36, so that the amount of coolant passing the radiator 6 increases.

Figure 9:
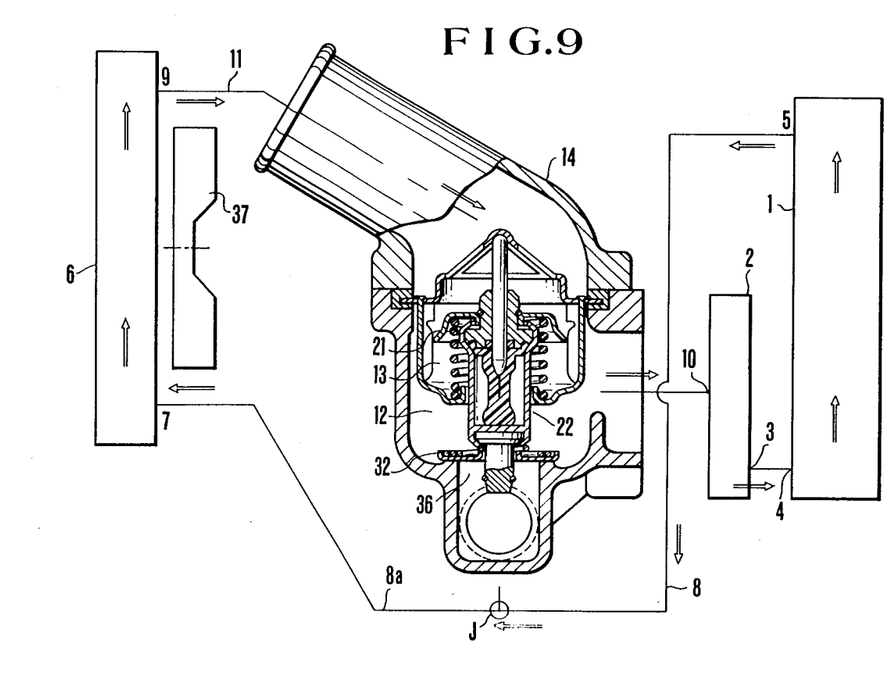
FIG. 9 is a schematic diagram of the system showing a circulation when the thermostat is fully opened.

As shown in FIG. 9, when the secondary valve 22 completely closes the bypass opening 36, all the coolant circulates through the radiator 6 from bottom to top thereof. When the temperature rises above a predetermined value, a radiator cooling fan 37 is driven by a motor (not shown).

In accordance with the present invention, the heat overshoot and surge during the initial opening period of thermostat can be eliminated. Accordingly, the predetermined opening temperature of the thermostat can be set at a higher temperature. The higher operating temperature improves engine efficiency and reduces exhaust emissions.

Figure 10:
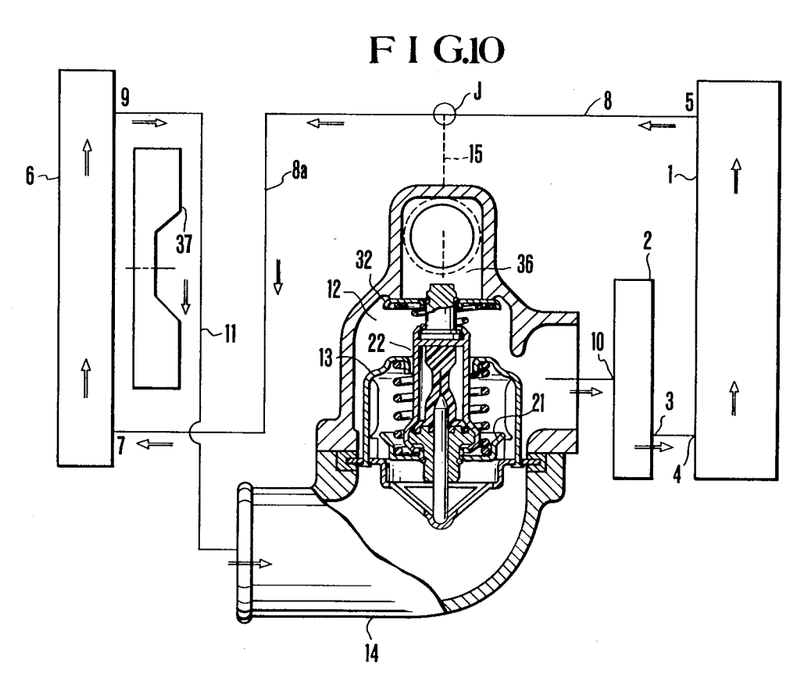
FIGS. 10 and 11 show second and third embodiments of the present invention.

FIG. 10 shows another embodiment of the engine cooling system of the present invention.

In this embodiment, the thermostat housing 12 is disposed in a passage 11 between the radiator 6 and water pump 2 in the upside-down position of the first embodiment. The upper outlet 5 of the water jackets 1 is connected to the lower inlet 7 of the radiator 6 by a passage 8.

Other structures are the same as the first embodiment and the same parts thereof are identified with the same reference numerals as FIGS. 5 to 9 and has the same operation as the first embodiment.

Figure 11:
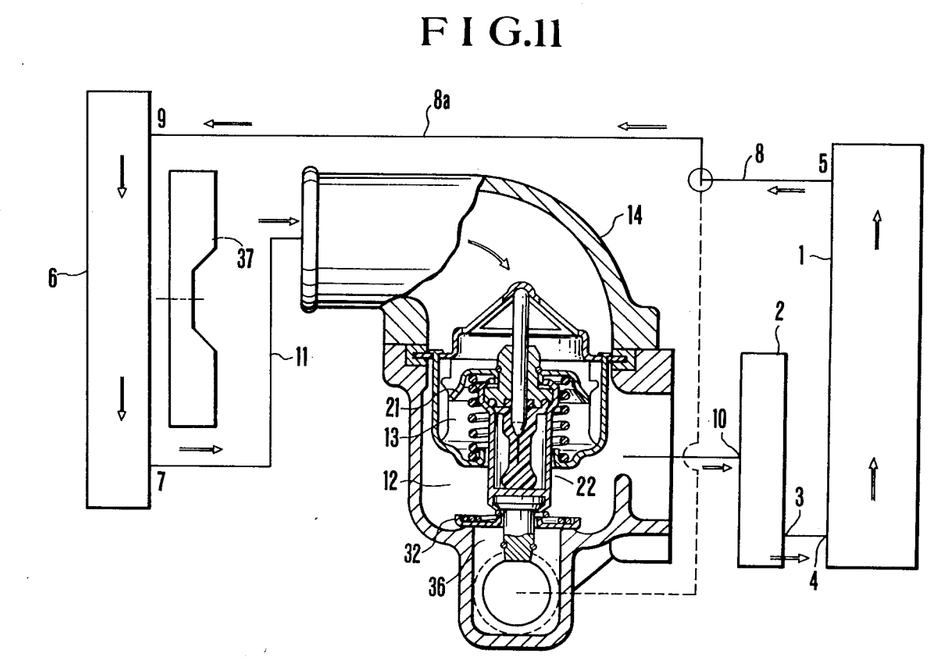

FIG. 11 shows a third embodiment of the invention. In the cooling system, the upper outlet 5 of the water jacket 1 is directly connected to an upper inlet 7a of radiator 6 by pasages 8 and 8a. A lower outlet 9a of the radiator 6 is connected to inlet 10 of the water pump 2 through passage 11. The thermostat housing 12 is disposed in the passage 11 between water pump 2 and radiator 6. In the thermostat housing 12, a thermostat 13 is mounted in the same manner as the first embodiment. The thermostat 13 is secured to the housing 12 of the cap 14. The large bypass passage 15 is disposed between bypass opening 36 of the housing 12 and junction J of the passage 8.

Other parts are the same as the first embodiment and identified with the same reference numerals. The system operates in a similar way to the first embodiment.

While the invention has been described in conjunction with preferred specific embodiments thereof, it will be understood that this description is intended to illustrate and not to limit the scope of the invention, which is defined by the following claims.

What is claimed is:

1. A cooling system for an automobile engine having a water jacket, a radiator, a water pump, and a thermostat housing, comprising:
   a first passage communicating an upper outlet of the water jacket with an inlet of the radiator provided at a lower portion thereof;
   a second passage communicating an upper outlet of the radiator with an inlet of the water pump and having the thermostat housing at the upstream of the pump;
   an outlet of the pump being communicated with a lower inlet of the water jacket;
   a bypass connected between the first passage and the thermostat housing;
   a thermostat comprising a thermo-sensitive device, a first valve and a second valve disposed in the thermostat housing, both the valves being operatively connected to the thermo-sensitive device, so that the first valve closes the second passage and the second valve opens the bypass;
   the thermo-sensitive device being disposed in the bypass and the first and second valves being operated by the operation of the thermo-sensitive device.

2. A cooling system for an automobile engine having water jackets, a radiator, a water pump, and a thermostat housing, comprising:
   a first passage communicating an outlet of the water jackets with an inlet of the radiator;
   a second passage communicating an outlet of the radiator with an inlet of the water pump and having the thermostat housing at the upstream of the pump;
   a bypass connected between the first passage and the thermostat housing;
   a thermostat comprising a thermo-sensitive device and a first valve and disposed in the thermostat housing, so that the first valve closes the second passage,
   the thermo-sensitive device being disposed in the bypass adjacent the junction of the bypass and the thermostat housing so that the thermo-sensitive device is exposed to coolant passing the junction, and
   the inlet of the radiator is provided at a lower position thereof.

3. A cooling system for an automobile engine having water jackets, a radiator, a water pump, and a thermostat housing, comprising:
   a first passage communicating an outlet of the water jackets with an inlet of the radiator;
   a second passage communicating an outlet of the radiator with an inlet of the water pump and having the thermostat housing at the upstream of the pump;
   a bypass connected between the first passage and the thermostat housing;
   a thermostat comprising a thermo-sensitive device and a first valve and disposed in the thermostat housing, so that the first valve closes the second passage,
   the thermo-sensitive device being disposed in the bypass adjacent the junction of the bypass and the thermostat housing so that the thermo-sensitive device is exposed to coolant passing the junction, and
   the first valve is provided at an upper position in the thermostat.

* * * * *